United States Patent [19]

Schulte et al.

[11] Patent Number: 4,614,848

[45] Date of Patent: Sep. 30, 1986

[54] SWITCH ARRANGEMENT WITH CLOSING LOCK

[75] Inventors: Siegfried Schulte; Manfred Böing, both of Lüdenscheid, Fed. Rep. of Germany

[73] Assignee: Firma Schulte-Elektrotechnik GmbH & Co., Fed. Rep. of Germany

[21] Appl. No.: 731,386

[22] Filed: May 7, 1985

[30] Foreign Application Priority Data

May 12, 1984 [DE] Fed. Rep. of Germany ....... 3417724
May 12, 1984 [DE] Fed. Rep. of Germany ....... 3417725

[51] Int. Cl.⁴ .......................... H01H 9/06; H01H 3/20
[52] U.S. Cl. .............................. 200/61.85; 200/153 T; 200/157; 200/332
[58] Field of Search ............... 200/50 A, 17 R, 61.85, 200/157, 42.01, 43.01, 43.02, 43.11, 43.13, 43.16, 43.17, 43.19, 321–327, 330, 332, 333, 335

[56] References Cited

U.S. PATENT DOCUMENTS

| | | | |
|---|---|---|---|
| 4,068,109 | 1/1978 | Hall | 200/327 X |
| 4,213,513 | 7/1980 | Beck | 200/61.85 X |
| 4,275,280 | 6/1981 | Yamazaki | 200/61.85 |
| 4,284,865 | 8/1981 | Nicholson | 200/61.85 X |

FOREIGN PATENT DOCUMENTS 1741255 3/1957 Fed. Rep. of Germany .
1030207 5/1958 Fed. Rep. of Germany .
3128691 3/1983 Fed. Rep. of Germany .

*Primary Examiner*—J. R. Scott
*Attorney, Agent, or Firm*—Bacon & Thomas

[57] ABSTRACT

A switch arrangement comprising a casing and a cover forming the enclosure for reception of a switch, provided with an automatically engaging lock pretensioned by a reset spring, a re-locking button for the lock and a pivoting switch lever for the actuation of a switch button for the switch. The technical object is the reduction of the components for the operating means and as a result of this an increase of the functional safety of the switch arrangement. The cover has a cylindrical wall which overlaps a cylinder-shaped ring wall of the casing and can be turned on the casing. Elements of the cover and the casing are formed for engagement to each other and have the function of a lock. The top surface of the cover has the function of a re-locking button. The switch lever is made in one piece with and moulded directly onto the cover.

15 Claims, 14 Drawing Figures

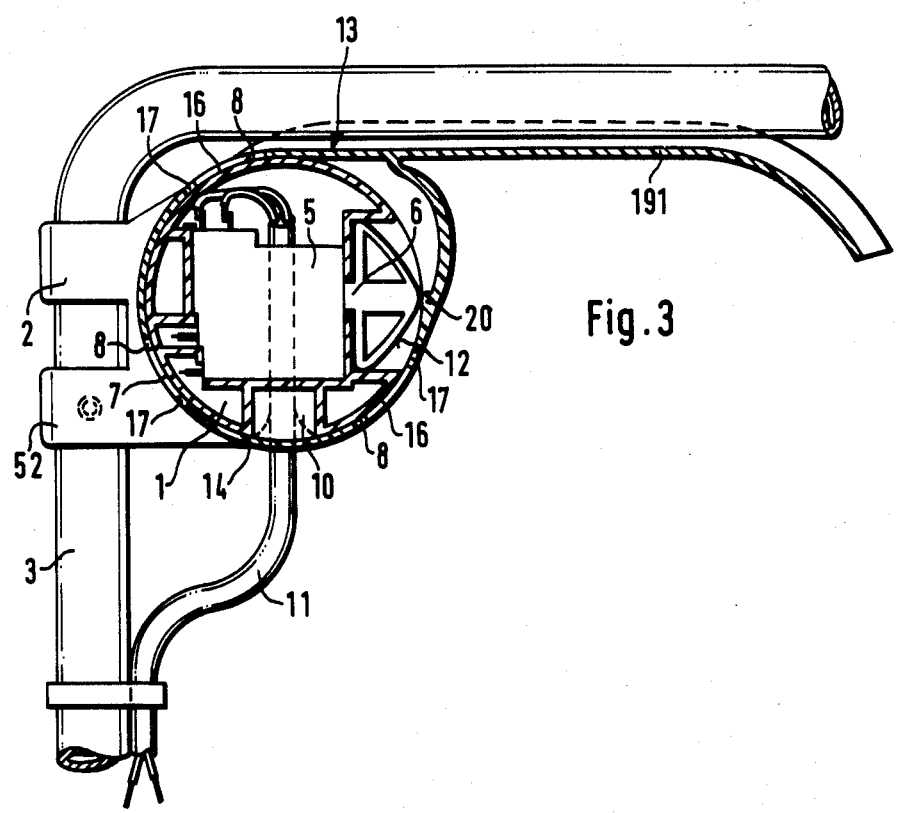
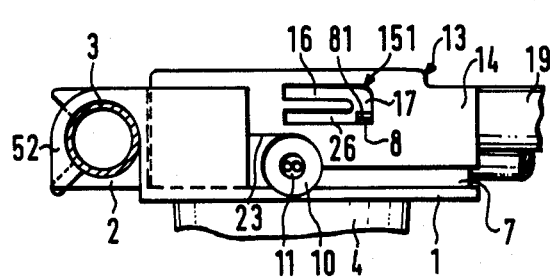 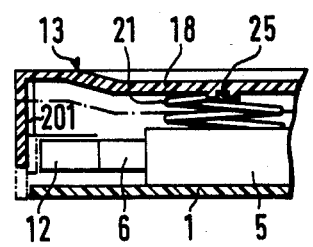

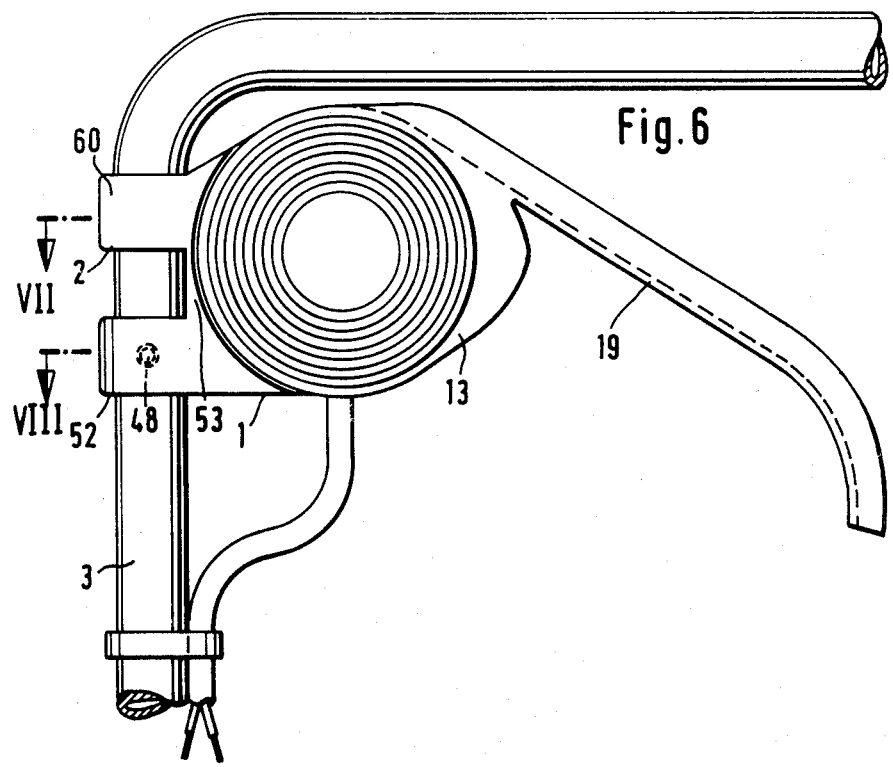
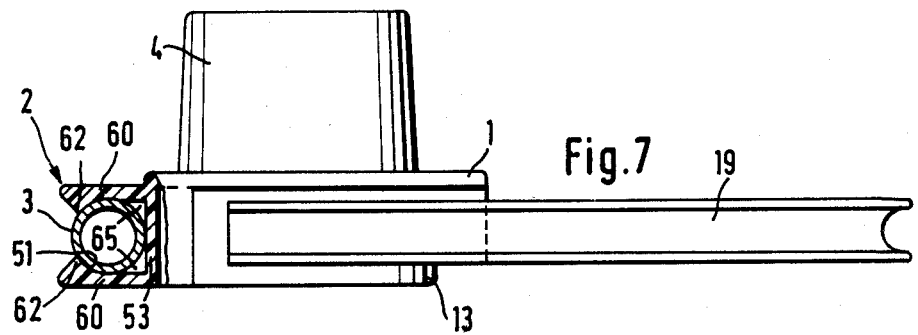
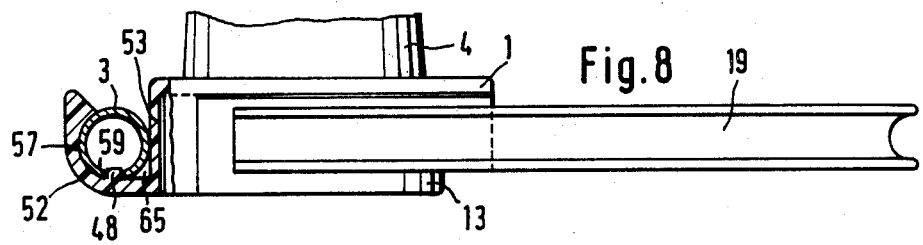

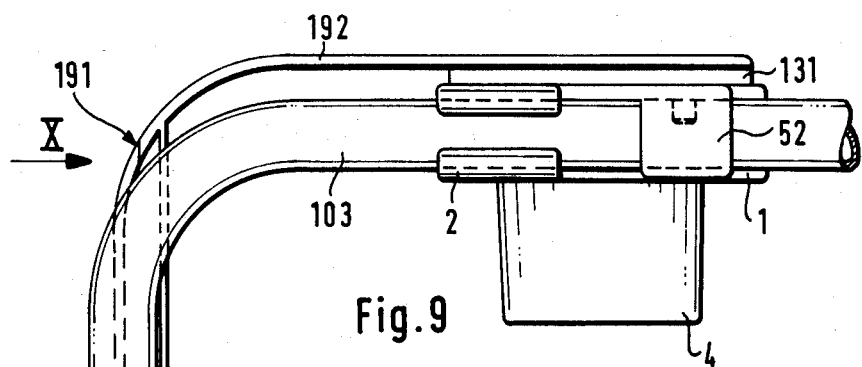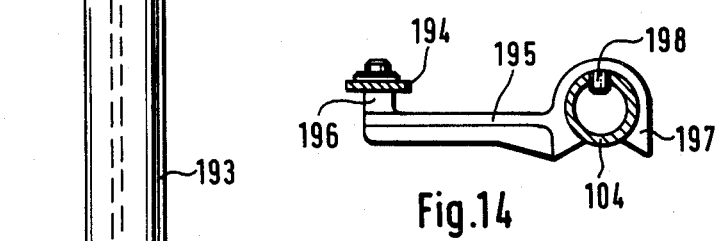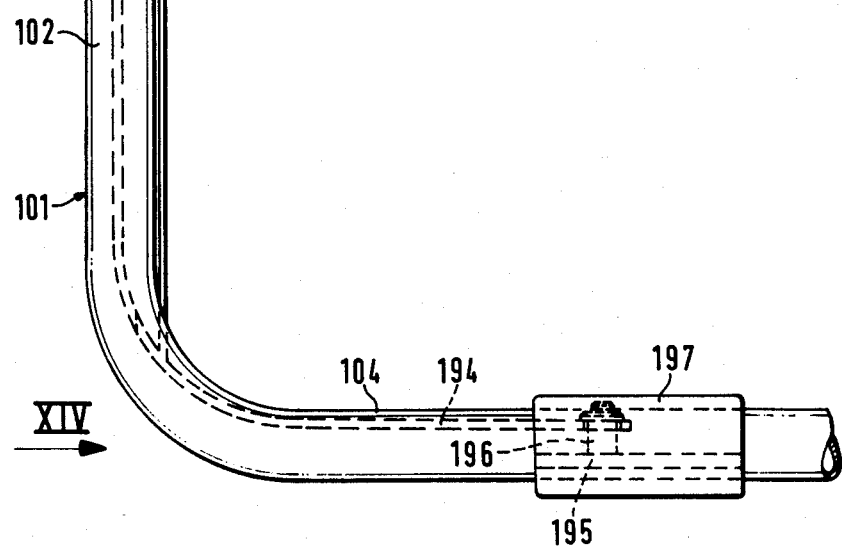

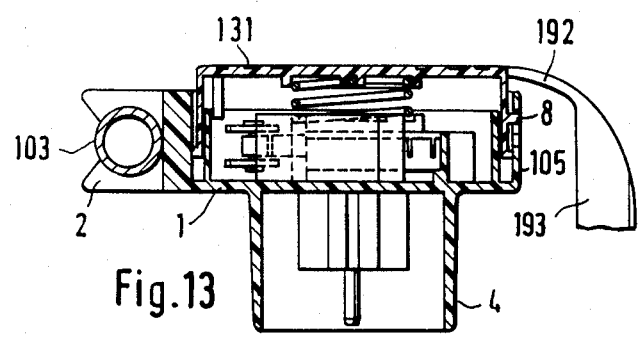
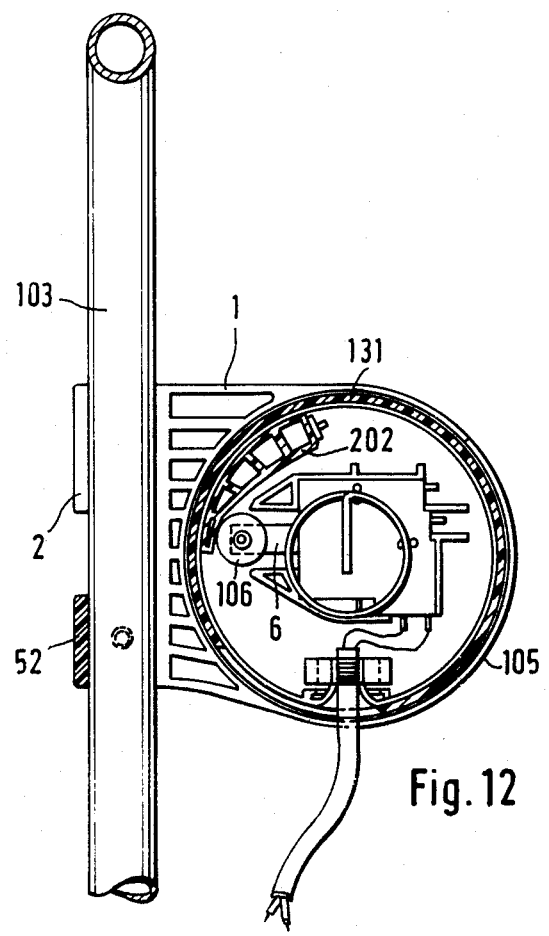

SWITCH ARRANGEMENT WITH CLOSING LOCK

BACKGROUND OF THE INVENTION

1. Field of the Invention

The invention relates to a switch arrangement comprising a casing and a cover, forming the enclosure for reception of a switch provided with an automatically engaging lock pretensioned by a reset spring, a re-locking button for the lock and a pivoting switch lever for the actuation of a switch button for the switch.

2. Description of the Prior Art

A switch arrangement of this kind according to DE-PS No. 31 28 691 includes in the interior of the two-half casing a pivotable switch lever and a re-locking button with a separately arranged lock which may, however, form a unit with the re-locking button. The re-locking button and/or the lock are operational with the switch lever in such a way that it is only possible to actuate the switch lever when the re-locking button is operated simultaneously or sequentially. Therefore this switch arrangement needs a multitude of operation elements. For these reasons the mounting of the switch arrangement is quite complicated.

SUMMARY OF THE INVENTION

The object of the invention is the reduction of the components for the operating means and as a result of this an increase in the functional safety of the switch arrangement.

This object is achieved by the following features:

(a) the cover overlaps with a cylindrical wall a cylinder-shaped ring wall of the casing and can be turned on said casing;

(b) elements of the cover and the casing are formed for engagement to each other and have the function of a lock;

(c) the top surface of the cover has the function of a re-locking button;

(d) the switch lever is made in one piece with and moulded directly onto the cover.

By these features the invention differs from the prior art as the cover is arranged together with the switch lever and the re-locking button as an integral element made of one piece. Consequently this component fulfills the function of the cover of the casing and is utilized as well as termination of this casing. Besides the cover is arranged rotatably so that it can be turned by means of the moulded switch lever. This effects the switch function. Finally the cover is displaceable in an axial direction and therefore fulfills the function of the re-locking button and the lock. The lock assures that the switch lever cannot be moved at all in the off-position or only in free operation position. Switching is not possible in locked position.

For pretensioning of the switch lever in off-position and as reset-element for the re-locking button this invention provides a pressure torsion spring which prestresses the cover with respect to the casing both in an axial direction and in a circumferential direction.

Further, the invention provides that when turning the cover after pushing the re-locking button, a profile nose is working with a profile curve of the switch button. When the cover is pressed it is possible to turn the switch lever and a positive connection between the profile nose and the profile curve of the switch button is produced.

For clicking the parts of the casing and as a lock the invention provides that the cylindrical wall of the cover is provided with several L-shaped slots therein, the locking nose being engageable in off-position with an axial leg of the respective slot. This embodiment provides that the cover and the switch lever are blocked in off-position against turning and operation.

Further, the invention provides that the profile nose covers the total axial height of the cover.

A modified embodiment provides that the cylindrical wall of the cover has several U-shaped slots, two legs of which are directed in a circumferential direction and the medium leg in an axial direction, whereas one locking nose each is adjusted in off-position on one of the legs in the circumferential direction and in on-position on the other leg, and that the profile nose ends at such a height that it is not engaged with the switch button in off-position. At this point the switch arrangement in the off-position is in a free operating position. The switch lever may be turned, however, there is no power transmission between the profile nose of the cover and the profile curve of the switch button. As the switch arrangement is in free operating position, a mechanical overloading of the components is impossible.

A further object of the invention is such a formation of the mounting means that the attachment at the bar is as simple as possible and can be made without additional fixing elements as screws or similar means in the following way:

(a) one fixing tongue has two parallel running resilient legs the interior surfaces of which show a rear-cut each; and (b) the other fixing tongue is provided as an angular tongue and encloses with the bearing wall a curve of more than 180°.

The attachment device can be positioned safely at the bar by pressing or clicking. An additional securing by screws or similar means is not necessary. The attachment device is mounted at the bar in such a way that the angular tongue is first pressed to the bar. In taking advantage of the elastic qualities of the material the attachment device can be turned around this angular tongue so that the resilient legs of the other fixing tongue are directed symmetrically to the bar and can be pressed on the bar. It is not necessary that a touch between the surfaces of the attachment tongues and the bar is effected on the complete arc of the surrounding.

For securing the attachment device in axial direction of the bar, the invention provides that the angular tongue has a pin, directed in parallel to the bearing wall and pointed to the center of the arc of the angular tongue. This keeps the attachment device fixed at the bar both in axial and in circumferential directions.

A safe reception of tensile loads vertically to the axis of the bar is obtained by the fact that the curve, surrounded by the angular tongue and the bearing surface reaches approximately up to 225°.

A protection of the attachment device against a torque applied perpendicularly to the axis of the bar is obtained by the fact that the interior surfaces of the legs of the first mentioned tongues enclose a curve of 270°.

A sufficient flexibility of the fixing tongues is provided by the fact that the leg and/or the angular tongue have a cut each on the root-area connecting to the bearing wall. This provides sufficient flexibility during the mounting.

A further development of the invention provides that the switch casing with the bearing wall and the fixing tongues is formed as a thermoplastic injection moulded part. Due to the fact that the attachment device is formed as a thermoplastic injection moulded part this ensures a high rigidity and nevertheless ensures a certain flexibility which provides a mounting without problems by making use of the elastic qualities of the material.

For reducing the friction during the switch movement it is provided that the switch button bears a roller cooperating with the profile nose.

A further object is directed to the possibility to actuate the switch arrangement with one hand or with both hands in that the switch lever is formed in U-shape and fitted to an U-shaped guide cross-bar and that the free leg of the switch lever is beared on a bearing block mounted on the guide cross-bar.

A stable and torsion free function of the switching lever is achieved by that the legs of the switch lever are formed as fishplates adjusted in a plane perpendicular to the axis of the switch lever and that the web of the switch lever has a chute-shaped profile.

BRIEF DESCRIPTION OF THE DRAWINGS

Preferred embodiments of the invention are described in detail with reference to the accompanying drawings. In the drawings:

FIG. 3 is a similar view as FIG. 2, the switch lever being in an on-position, FIG. 4 is a view of a further embodiment of the invention, FIG. 5 is a sectional view through the profile nose, FIG. 6 is a view of the attachment of the switch arrangement at the bar, FIG. 7 is a sectional view along the line VII of FIG. 6, FIG. 8 is a sectional view along the line VIII of FIG. 6, FIG. 9 is a view of a further embodiment of the invention, FIG. 12 is a similar view as FIG. 11, with the cover being removed, FIG. 13 is a cross-section along the line XIII—XIII in FIG. 11, FIG. 14 is a view in the direction XIV in FIG. 9.

DESCRIPTION OF THE PREFERRED EMBODIMENT

Figure 1:
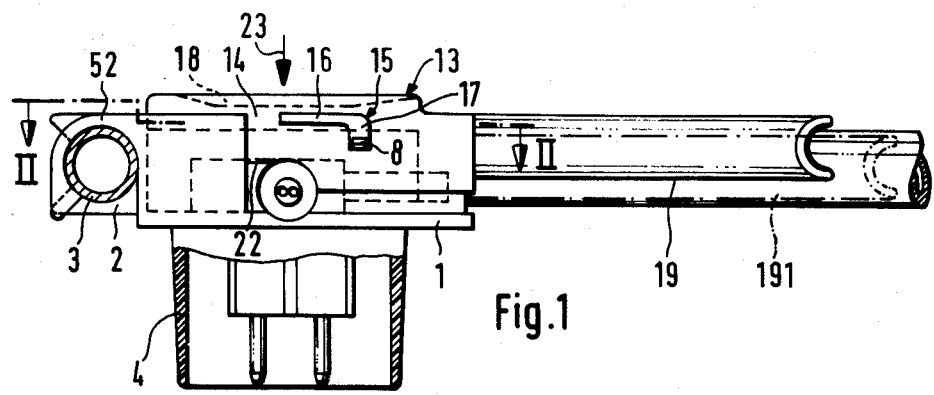
FIG. 1 is a view of the switch arrangement according to the invention.

The switch arrangement comprises a casing 1 on which fixing tongues 2, 52 are moulded which are used for the attachment to a bar 3. The bar 3 can be a bar of a lawn mower. The attachment is explained below in detail with regard to FIGS. 6 to 8. The described embodiment refers to a lawn mower with a push bar. Of course the invention may be applied as well for hovermowers or other gardening or working machines.

An electrical plug 4 is moulded at the casing 1 in one piece. The casing 1 receives in a chamber a switch 5 with a switch button 6 the top surface of which is formed as a profile curve 12. Finally the casing 1 has a cylindrical ring wall 7. Three or more locking noses 8 are moulded on the cylindrical ring wall 7. The surface 81 of each locking nose 8 directed to the open face of the ring wall 7 is wedge-shaped. Further the casing 1 is provided with an installation 10 for a strain relief of an outlet cable 11.

A cover 13 surrounds the casing 1. A cylindrical wall 14 of the cover 13 overlaps the ring wall 7. Corresponding to the number of the locking noses 8, a plurality of L-shaped slots 15 are provided in the cylindrical wall 14, one leg 16 of each slot 15 is directed in the circumferential direction and one leg 17 directed in the axial direction. The top surface of the cover 13 has the function of an unlocking button 18. A switch lever 19 is moulded on the cover 13 in one piece. Finally the cover 13 has a profile nose 20 used as a switching nose at its interior surface which is engageable with the profile curve 12 of the switch button 6. The cylindrical wall 14 is shaped concavely at its outlines in order to conform to the profile nose 20 and provide a faultless switch operation.

Figure 2:
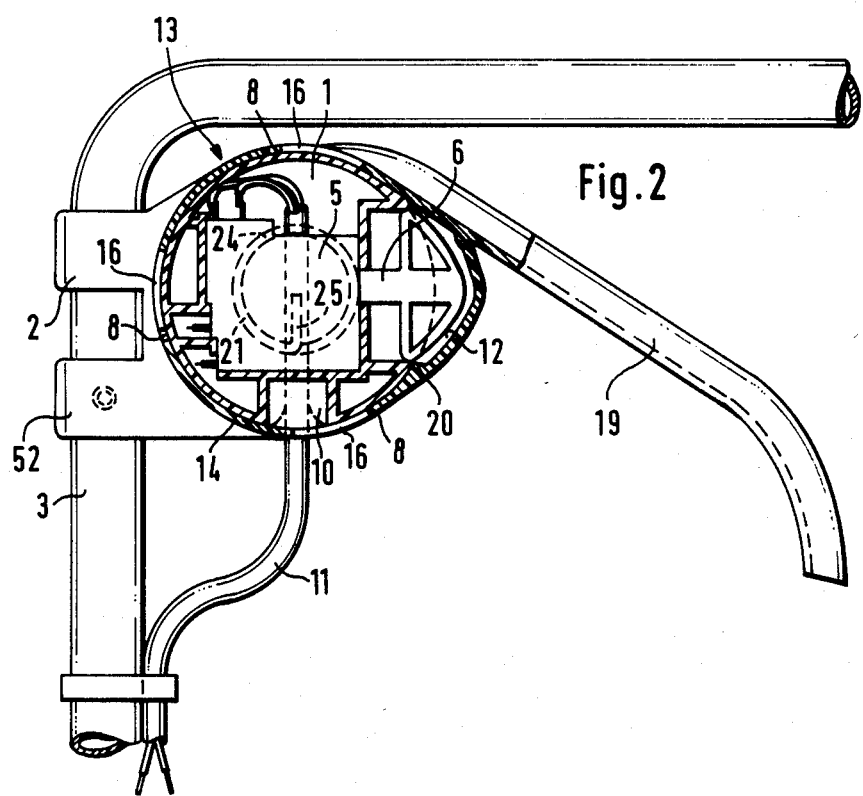
FIG. 2 is a top view of FIG. 1, taken along the line II—II with the cover partly removed.
Figure 11:
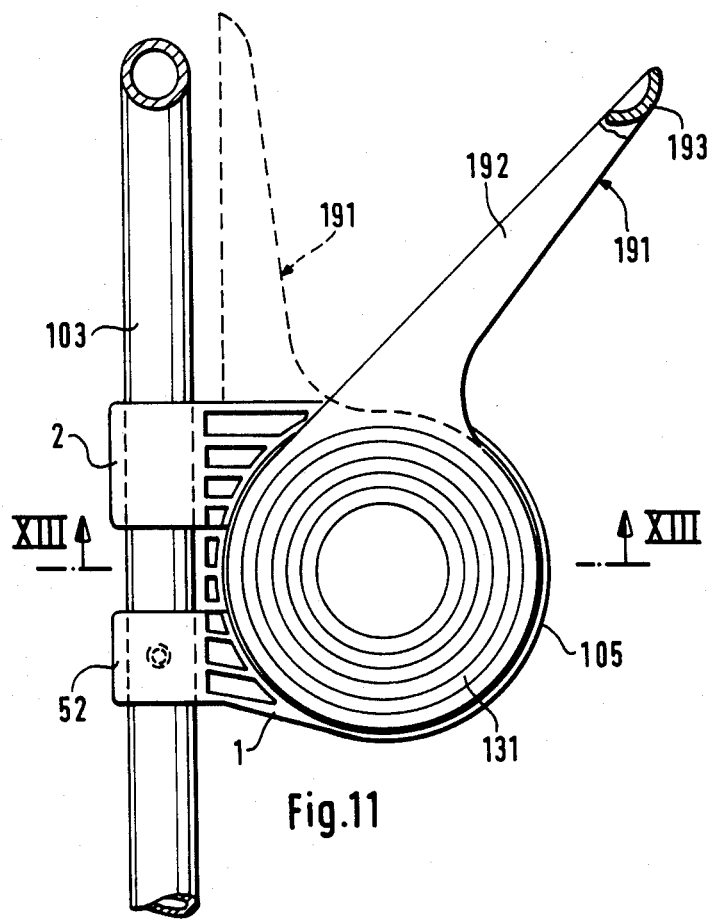
FIG. 11 is an elevation view of FIG. 10.
Figure 10:
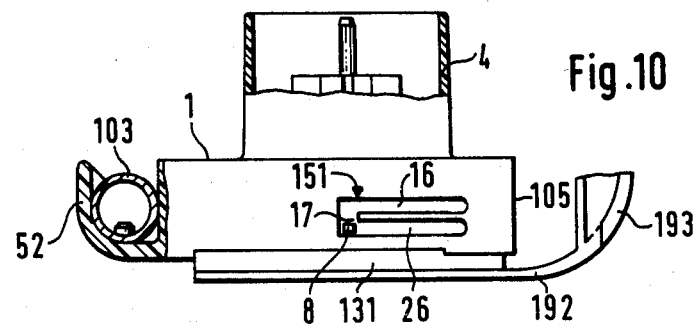
FIG. 10 is a view in direction X of FIG. 9, with the switching lever cut-away.

A pressure torsion spring 21 is laid in the enclosure and is beared at the inside of the cover 13. The pressure torsion spring 21 is positioned with one leg 24 in the casing 1 and with another leg 25 in the cover so that the pressure torsion spring 21 exerts a torque moment in a clockwise direction on the cover 13 which regard to FIG. 2. Further the pressure torsion spring 21 pretresses the cover 13 in an axial direction. The cover 13 shows a cut 22 so that the outlet cable 11 does not hinder turning of the cover 13.

According to the invention only the casing 1, the cover 13 and the pressure torsion spring 21 are necessary to operate the switch 5, to guarantee the safety functions and the mechanical connection of the switch arrangement. After inserting the switch 5 and the pressure torsion spring 21 into the casing 1 these components are assembled by pressing the cover 13 in the direction of the arrow 23. During this operation case has to be taken by applying a respective turning movement to the cover 13 so that the pressure torsion spring 21 enters the respective receptions in the casing end the cover with both legs 24 and 25 and is prestressed correspondingly. At the same time the locking noses 8 are engaged in the axial legs 17 of the slots 15. The pressure torsion spring 21 prestresses the cover 13 opposite to the direction of the arrow 23. In this position it is not possible to turn the cover by operating the switch lever 19 because the locking nose 8 blocks this turning movement. These locking noses 8 have the function of a closing lock and make impossible any movement of the switch lever.

For switching on, the unlocking button 18 with the cover 13 has to be pressed in the direction of the arrow 23, until the locking noses 8 are directed towards the legs 16 of the slots 15 which are directed in circumferential direction. Now the switch lever 19 can be turned in the counterclockwise direction into siwtch position 191 according to FIG. 3. The switch lever 19 is shifted together with the cover 13 into position 191 of FIG. 1, marked in a dashdotted line. During the switching movement the profile nose 20 is engaged with the profile curve 12 and moves the switch button 6 in on-position. The switch arrangement remains in on-position as long as the switch lever 19 is in touch with the bar 3. As soon as the switch lever 19 is released it returns into the position according to FIG. 2 due to the effect of the pressure torsion spring 21 bringing the cover in the locking position according to FIG. 1.

The FIGS. 4 and 5 show a further embodiment of the invention where the closing lock has the function of a free operating position. The slots 151 are provided in U-shape, a further leg 26 being directed in circumferential direction, in parallel to the leg 16. The profile nose 201 only covers a part of the axial height of the cover 13, so that the profile nose 201 is not engaged in the profile curve during off-position.

In the off-position the locking noses 8 are always in a position according to FIG. 4 at the lower end of the axial slot 17. In this position it is possible to turn freely the switch lever 19 with the cover 13. A switching, however, is not effected as there is not any mechanical force existing between the profile nose 201 and the profile curve 12. The switch arrangement is in a free operating position. After pressing the cover 13 switching is effected in the same way as for the previously mentioned embodiment because then the profile nose 201 is engaged with the profile curve 12.

FIGS. 6 to 8 show in detail the attachment of the switch arrangement on the bar. The casing 1 has a bearing wall 53 which is fixed at the bar 3. Two spaced fixing tongues 2, 52 project from the bearing wall 53, one of which is formed as an angular tongue 52. The profile of the angular tongue 52 can be seen from FIG. 8. The angular tongue 52 reaches over a large circumferential arc. The interior surface of the angular tongue 52 encloses with the bearing wall 53 an arc 57 of approximately 225°. The radius of the arc 57 corresponds to the radius of the bar. In the root-area of the angular tongue 52 at the bearing wall 53 a cut 65 is made, so that the bar 3 cannot be touched at this point. This cut 65 assures that the cross section of the angular tongue does not become too large, because the angular tongue 52 shall provide a sufficient flexibility in order to enable a suitable assembly. The angular tongue 52 is provided with a pin 48 which is directed almost in parallel to the bearing wall 53 and which engages in a passage 59 of the bar 3.

The profile of the fixing tongue 2 can be seen from FIG. 7. The fixing tongue 2 consists of two parallel legs 60, the interior surfaces of which together define with the bearing wall 53 an arc 51, which reaches nearly over 270°. The inner surfaces of the legs 60 therefore show rear-cuts subsequent to the front edges 62. Each leg 60 as well shows a cut 65 at the interior surface in the root-area which provides a sufficient flexibility of the legs 60.

The attachment of the switch casing at the bar is effected in a simple way by pressing it to the bar 3. The passage 59 is drilled in the bar 3. First the angular tongue 52 is pressed on the bar 3 and the pin 48 engages the passage 59. This makes it possbile to cant the casing as far as necessary alongside the bar. After the angular tongue 52 has been pressed to the bar the switch casing is turned round the axis of the pin 58 so that the legs 60 of the fixing tongues 5, 52 can be directed symmetrically to the bar. Then the switch casing is pressed perpendicular to the longitudinal axis at the bar 3 in such a way that the legs 60 enclose the bar as it can be seen from FIG. 7. The elasticity of the casing and especially of the angular tongue 52 and the legs 60 ensure these elastic deformations. The mounting also may be effected in reverse order pressing first the legs 60 to the bar.

In mounted condition the pin 48 keeps the switch casing fixed to the bar. The mounting tongue 2 especially absorbs torque moments which are effective around the axis of the bar, i.e. on pressing or mounting a cable coupling to the plug. The angular tongue 52 prevents first of all any removal from the bar, where even pitching moments which may arise during operation of the switch lever are safely absorbed. Due to the fact that a metallic screw connection or any other additional connection is not necessary the electrical safety is increased, especially with regard to the high voltage strength and the splash-proof test. The mounting is simplified and shortened considerably.

The FIGS. 9 to 14 show a further embodiment of the invention. FIG. 9 shows the U-shaped guide cross-bar 101, comprising a centre web 102 and legs 103 and 104. The casing is fixed to the tubular leg 103 which is held by fixing tongues 2, 52 in the same way as shown in FIGS. 6 to 8. The cover 131 cannot only be pressed in axial direction, but may be turned as well in circumferential direction and engages in a ring wall 105 of the casing 1. The ring wall 105 is provided with slots 151 comprising legs 16 and 26 running in circumferential direction and one leg 17 running in axial direction. Locking noses 8 are positioned at the outer surface of the cover 131 engaging in a slot 151 respectively. A switch profile 202 is mounted on the cover 131 for engaging a roller 106 of the switch button 6. The roller 106 has the function of reducing friction resulting from the switching movement.

A U-shaped switch lever 191 is mounted in one piece with the cover 131 comprising a first fishplate shaped leg 192, a centre web 193 and a second fishplate shaped leg 194. The U-shaped switch lever 104 is adapted in its dimensions and its outlines to the guide cross-bar 101 what can be seen clearly from FIG. 9. The fishplate shaped legs 192 and 194 are generally formed as flat fishplates which are adjusted in a radial plane to the rotational axis of the switch lever 191. The centre web 193 has a chute-shaped profile which can be seen from FIGS. 10 and 11 in order to provide sufficient rigidity of the centre web against deformation. The other fishplate shaped leg 194 is positioned on a pin 196 of a bearing block 195 and can be turned. The axis of the pin 196 is fixed by means of fixing tongues 197 and a pin 198 to the tubular leg 104 of the guide cross-bar 101.

This embodiment of the switch arrangement enables a two-hand operation of the switch lever 191. For unlocking when switching, the cover 131 is pressed in axial direction. Then the switch lever 191 is turned from the position marked in solid lines according to FIG. 11 to the position marked in dash-dotted lines according to FIG. 11 so that it lies closely to the guide cross-bar 101. The switch lever 191 can be held with both hands or alternatively with the right or the left hand. The switch lever 191 will be placed close to the centre web 102 of the guide cross-bar 101 so that it may be held in on-position without difficulty. Due to the profile of the centre web 193 the switch lever 191 has a sufficient rigidity and it lies closely and securely at the guide cross-bar.

We claim the following:
1. A switch arrangement comprising:
 (a) a cover including a cylindrical wall;
 (b) a casing including a cylinder-shaped ring wall;
 (c) the cylindrical wall of the cover circumferentially overlaps the ring wall of the casing for defining an enclosure;
 (d) a switch disposed within the enclosure and including an actuation button;
 (e) means carried by the cover and casing for defining a lock;

(f) the cover being axially movable with respect to the casing for disposing the cover between a first position wherein the lock prevents rotation of the cover, and a second position wherein the cover is permitted to rotate with respect to the casing for actuation of the switch;

(g) spring means disposed within the casing for pretensioning the cover into the first position;

(h) the top surface of the cover defining an unlocking button for moving the cover axially into the second position; and (i) a switch lever integrally molded to the cover for rotating the cover with respect to the casing for engaging the actuation button when the cover is disposed in the second position.

2. The switch arrangement of claim 1 wherein the spring means pretensions the cover in axial and circumferential directions with respect to the casing.

3. The switch arrangement of claim 1 wherein the actuation button includes a profile curve, the cylindrical wall of the cover includes a profile nose, and the profile nose engages the profile curve when the cover is rotated with respect to the casing.

4. The switch arrangement of claim 1 wherein the means carried by the cover and casing for defining a lock includes a plurality of L-shaped slots formed in the cylindrical wall of the cover and a corresponding number of locking noses carried by the ring wall of the casing engaged within the L-shaped slots, wherein the cover is disposed in a first position when the locking noses are disposed within the axially directed legs of the L-shaped slots.

5. The switch arrangement of claim 2 wherein the profile nose extends across substantially the entire width of the cylindrical wall.

6. The switch arrangement of claim 1 wherein the cylindrical wall of the cover includes a plurality of U-shaped slots, with the two legs of each slot being circumferentially directed and the intermediate leg of each slot being axially directed, and a locking nose engaged within each U-shaped slot 7. The switch arrangement of claim 1 further including a bearing wall, a pair of spaced tongues carried by the bearing wall, including a first tongue defined by two parallel resilient legs, and a second tongue being of angular configuration and defining a curve of more than 180°.

8. A switch asrrangement according to claim 7 wherein the second tongue includes a pin disposed in parallel to the bearing wall and directed towards the center of the arc formed by the curve.

9. The switch arrangement of claim 7 wherein the curve extends for approximately 225°.

10. The switch arrangement of claim 7 wherein the interior surfaces of the legs defining the first tongue form a curve of at least 270°.

11. The switch arrangement of claim 7 wherein the portions of the legs defining the first tongue and portion of the angular configuration defining the second tongue joining the first and second tongues to the bearing wall are each provided with a cut.

12. The switch arrangement of claim 7 wherein the casing, bearing wall, and first and second tongues are integrally formed from injection molded thermoplastic material.

13. The switch arrangement of claim 1 wherein the cylindrical wall of the cover includes a profile nose and the actuation button includes a roller engageable by the profile nose when the cover is rotated with respect to the casing.

14. The switch arrangement of claim 1 wherein the switch lever is of U-shaped configuration for attachment to a U-shaped guide cross-bar, one leg of the switch lever being attachable to a bearing block carried by the cross-bar.

15. The switch arrangement of claim 14 wherein the legs of the switch lever are in the form of fish plates adjustable in a plane disposed perpendicular to the axis of the switch lever, and the switch lever includes a web having a chute-shaped profile.

* * * * *